US008452834B2

(12) United States Patent
Kawada

(10) Patent No.: US 8,452,834 B2
(45) Date of Patent: May 28, 2013

(54) INFORMATION PROCESSING APPARATUS, PROGRAM, AND INFORMATION PROCESSING SYSTEM

(75) Inventor: Masato Kawada, Tokyo (JP)

(73) Assignee: Sony Corporation (JP)

( * ) Notice: Subject to any disclaimer, the term of this patent is extended or adjusted under 35 U.S.C. 154(b) by 386 days.

(21) Appl. No.: 12/568,840

(22) Filed: Sep. 29, 2009

(65) Prior Publication Data

US 2010/0082741 A1   Apr. 1, 2010

(30) Foreign Application Priority Data

Sep. 30, 2008   (JP) ................................ P2008-253820

(51) Int. Cl.
*G06F 15/16*   (2006.01)

(52) U.S. Cl.
USPC ........... 709/203; 709/230; 709/231; 709/232; 726/26; 726/27; 726/28; 726/29; 726/30; 726/31; 726/32; 726/33

(58) Field of Classification Search
USPC ............ 709/203, 230, 231, 232, 233; 726/26, 726/27, 28, 29, 30, 31, 32, 33
See application file for complete search history.

(56) References Cited

U.S. PATENT DOCUMENTS

| 2002/0143907 A1* | 10/2002 | Tsurubayashi | 709/221 |
| 2004/0006713 A1* | 1/2004 | Minemura | 713/201 |
| 2008/0189776 A1* | 8/2008 | Constable | 726/7 |

FOREIGN PATENT DOCUMENTS

| EP | 1780641 A1 * | 5/2007 |
| JP | 11-161657 | 6/1999 |
| JP | 2001 154933 | 6/2001 |
| JP | 2002 183097 | 6/2002 |
| JP | 2002-202927 | 7/2002 |
| JP | 2003 30087 | 1/2003 |
| JP | 2006 65660 | 3/2006 |

OTHER PUBLICATIONS

Masaki Chibana et al., "Contents List Delivery Method for Push type VOD systems", Information Processing Society memoir, vol. 2006, No. 132, p. 99-102, 2006-AVM-55-18, Information Processing Society of Japan, Dec. 15, 2006 (CSDB: Domestic Society article 200700233013).

* cited by examiner

*Primary Examiner* — Liangche A Wang
*Assistant Examiner* — Cheikh Ndiaye
(74) *Attorney, Agent, or Firm* — Lerner, David, Littenberg, Krumholz & Mentlik, LLP

(57) ABSTRACT

An information processing apparatus that includes a communication unit for performing communication with one or more external devices and a storage unit for storing device information containing first authentication information used for authentication to selectively perform a process related to transmission of content data on the external device. The information processing apparatus also includes an authenticating unit for authenticating the external device that has transmitted a processing request based on second authentication information contained in the processing request transmitted from the external device and the device information. Furthermore, a processing unit is used for selectively performing a process corresponding to the processing request based on an authentication result in the authenticating unit; and a data transmitting unit for selectively transmitting content data to the external device.

7 Claims, 9 Drawing Sheets

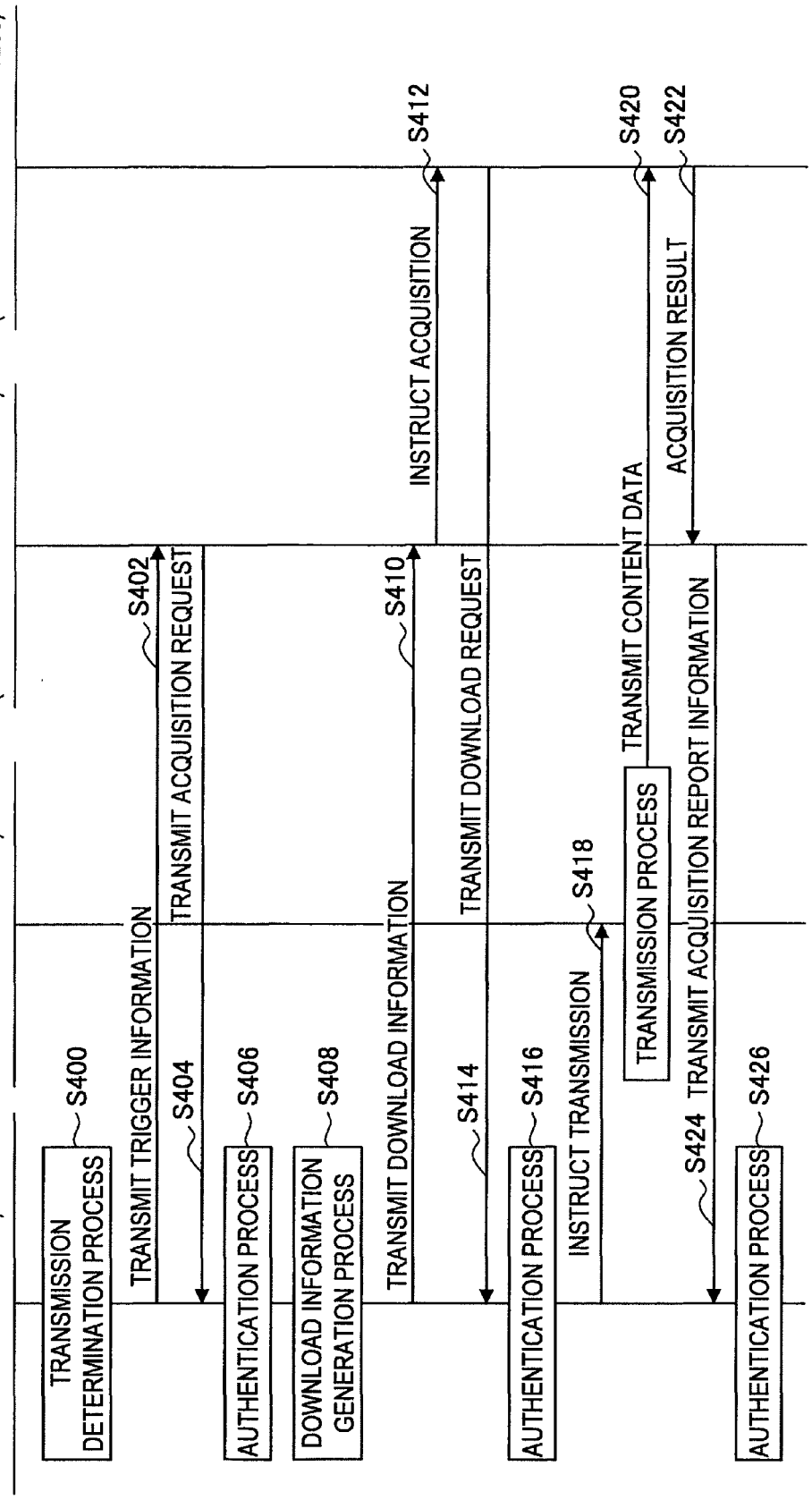

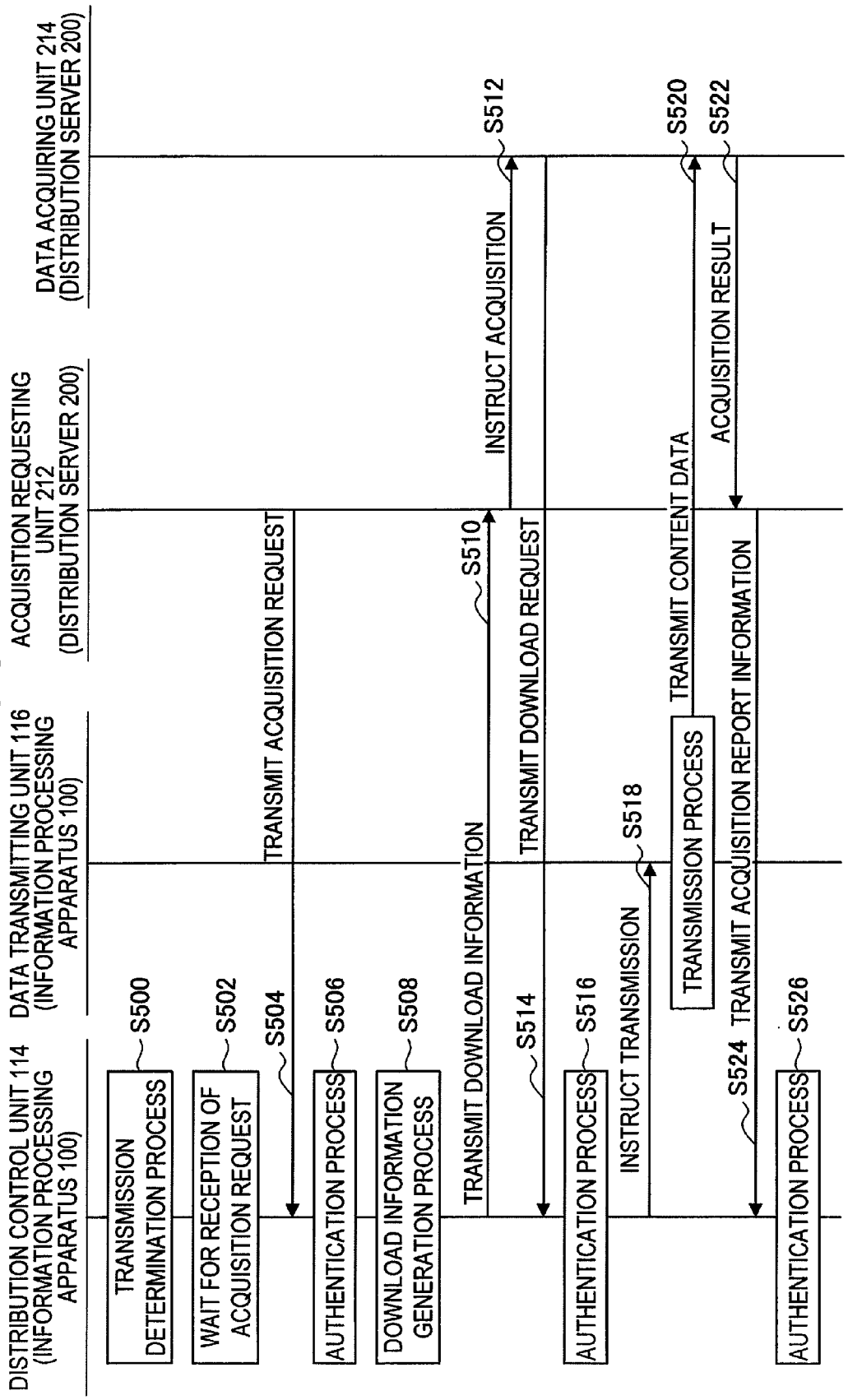

INFORMATION PROCESSING APPARATUS, PROGRAM, AND INFORMATION PROCESSING SYSTEM

BACKGROUND OF THE INVENTION

1. Field of the Invention

The present invention relates to an information processing apparatus, a program, and an information processing system.

2. Description of the Related Art

In recent years, various services for distributing content data representing content such as video and audio to a different device using the network have appeared with widespread use of the network such as Internet. The services include stream distribution service in which a server distributes the content data to a computer such as PC (Personal Computer), and digital signage in which the content corresponding to time and place are displayed on a display device installed in a public facility and the like.

A technique related to the transmission of the content data from an information processing apparatus (so-called server) to an external device (so-called client device) is being developed. The technique of preventing congestion of the network and realizing smooth distribution of the content data is, for example described in Japanese Patent Application Laid-Open No. 2002-202927. A technique of increasing the speed of display of the information to the user terminal by passing the information through a separate computer server when providing the information from an information providing server to the user terminal is, for example, described in Japanese Patent Application Laid-Open No. 11-161657.

SUMMARY OF THE INVENTION

However, in a technique of the related art related to the transmission of the content data from the information processing apparatus to the external device (hereinafter referred to as "technique of related art"), consideration is not made on the issue of safety related to the transmission of the content data. The issue of safety related to the transmission of the content data includes spoofing of the external device that receives the content data, alteration or tapping of the transmitted content data, and the like. The information processing apparatus thus may not enable the external device of transmission target to receive the content data to be transmitted even if the technique of the related art is used.

An example of a method for solving such method includes the following (a) and (b).

(a) Method of using a push method for the method of transmitting the content data One method for solving the above issue includes a method of arranging a VPN (Virtual Private Network) device both on the information processing apparatus side and on the external device side, and transmitting the content data from the information processing apparatus to the external device using the VPN. Since the safety of the communication between the information processing apparatus and the external device can be enhanced by using the above-described method, the external device of the transmission target can more reliably receive the content data to be transmitted. However, the VPN device is to be arranged on the information processing apparatus side and the external device side to realize the above-described method. That is, in the above method, the device cost, the operation cost, and the like increase the greater the number of external device, that is, the larger the scale of the information processing system including the information processing apparatus and the external device.

(b) Method of using a pull method for the method of transmitting the content data Another method for solving the issue includes a method in which the external device accesses the information processing apparatus and downloads the content data from the information processing apparatus (information processing apparatus transmits the content data in response to the access). The information processing apparatus then can enable the external device (external device of the transmission target) that made the access to receive the content data to be transmitted through the use of such method. However, if a plurality of external devices makes the access to the information processing apparatus at the same timing, the processing load of the information processing apparatus increases, thereby leading to breakdown or functional decline of the information processing apparatus. If the information processing system is used in a service for reproducing the content data at a specific location and at a specific time as in digital signage, the breakdown and functional decline of the information processing apparatus cause stop or degradation of the service.

Thus, other issues arise even if the technique of the related art and the method of (a), (b) are combined. Therefore, even if the techniques of the related art are used, more safely reception of content data transmitted from the information processing apparatus to a target external device will be hardly expected.

The present invention addresses the above-identified, and other issues associated with conventional methods and apparatuses, and it is desirable to provide a new and improved information processing apparatus, a program, and an information processing system for enabling the external device of the transmission target to more safely receive the content data to be transmitted.

According to an embodiment of the present invention, there is provided an information processing apparatus including: a communication unit for performing communication with one or more external devices; a storage unit for storing device information containing first authentication information used for authentication to selectively perform a process related to transmission of content data on the external device to which the content data is transmittable; an authenticating unit for authenticating the external device that has transmitted a processing request based on second authentication information contained in the processing request transmitted from the external device and the device information stored in the storage unit; a processing unit for selectively performing a process corresponding to the processing request based on an authentication result in the authenticating unit; and a data transmitting unit for selectively transmitting content data to the external device, which transmitted the processing request and which is authenticated by the authenticating unit, based on a processing result of the processing unit.

According to such configuration, the external device of transmission target can more safely receive the content data to be transmitted.

The device information may contain transmission destination information indicating a transmission destination of the external device to transmit the content data. The information processing apparatus may further include a transmission determining unit for determining whether or not to transmit to the external device trigger information for causing the external device to transmit an acquisition request for starting the process related to transmission of the content data based on the transmission destination information contained in the device information stored in the storage unit. The processing unit may cause the communication unit to transmit the trigger information to the external device if the transmission determining unit determines that the trigger information is to be transmitted, and not to transmit the trigger information to the external device if the transmission determining unit determines that the trigger information is not to be transmitted.

The authenticating unit may authenticate the external device that has transmitted the acquisition request based on the second authentication information contained in the acquisition request transmitted from the external device and the device information stored in the storage unit, and the processing unit may cause the communication unit to transmit to the external device download information for causing the external device to acquire the content data when the authenticating unit has been completed authenticating.

The authenticating unit may authenticate the external device that has transmitted a download request which is transmitted from the external device based on the download information, based on the second authentication information contained in the download request and the device information stored in the storage unit. The processing unit may transmit a transmission instruction for causing the external device to transmit the content data to the data transmitting unit when the authenticating unit has been completed authenticating, and the data transmitting unit may transmit the content data to the external device based on the transmission instruction.

The information processing apparatus may further include a scheduling unit for setting a transmission processing order for starting the process of transmitting the content data to the external device, and the transmission determining unit may determine whether to transmit the trigger information or not, based on the transmission processing order set by the scheduling unit.

According to the embodiments of the present invention described above, there is provided a program causing a computer to execute the steps of authenticating an external device that has transmitted a processing request based on device information stored in a storage unit for storing the device information containing first authentication information used for authentication to selectively perform a process related to transmission of content data on an external device to which content data is transmittable, and second authentication information contained in the processing request transmitted from the external device received by a communication unit, selectively performing a process corresponding to the processing request based on an authentication result in the authenticating step, and selectively transmitting the content data to the external device, which transmitted the processing request and which is authenticated in the authenticating step, based on a processing result in the step for performing the process.

Through the use of such program, the external device of transmission target can more safely receive the content data to be transmitted.

According to the embodiments of the present invention described above, there is provided an information processing system including: an information processing apparatus for managing transmission of content data, and one or more distribution servers for acquiring the content data from the information processing apparatus, wherein the information processing apparatus includes a communication unit for performing communication with one or more distribution servers, a storage unit for storing device information containing first authentication information used for authentication to selectively perform a process related to transmission of content data on the external device to which the content data is transmittable, an authenticating unit for authenticating the external device that has transmitted a processing request based on second authentication information contained in the processing request transmitted from the distribution server and the device information stored in the storage unit, a processing unit for selectively performing a process corresponding to the processing request based on an authentication result in the authenticating unit, and a data transmitting unit for selectively transmitting content data to the distribution server, which transmitted the processing request and which is authenticated by the authenticating unit, based on a processing result of the processing unit, and each distribution server includes a server side communication unit for performing communication with the information processing apparatus, a server side storage unit for storing the second authentication information for causing the information processing apparatus to perform the authentication, an acquisition requesting unit for causing the information processing apparatus to transmit an acquisition request for starting the process related to transmission of the content data, and a data acquiring unit for acquiring the content data from the information processing apparatus based on download information for causing the external device to acquire the content data transmitted from the information processing apparatus based on the acquisition request.

According to such configuration, an information processing system in which the information processing apparatus enables the distribution server of transmission target to more safely receive the content data is realized.

According to the embodiments of the present invention described above, the external device of transmission target can more safely receive the content data to be transmitted.

BRIEF DESCRIPTION OF THE DRAWINGS

FIG. 8 is an explanatory view showing a first example of the process related to the transmission and reception of the content data between the information processing apparatus and the distribution server according to the embodiment of the present invention.

FIG. 9 is an explanatory view showing a second example of the process related to the transmission and reception of the content data between the information processing apparatus and the distribution server according to the embodiment of the present invention.

DETAILED DESCRIPTION OF THE PREFERRED EMBODIMENTS

Figure 1:
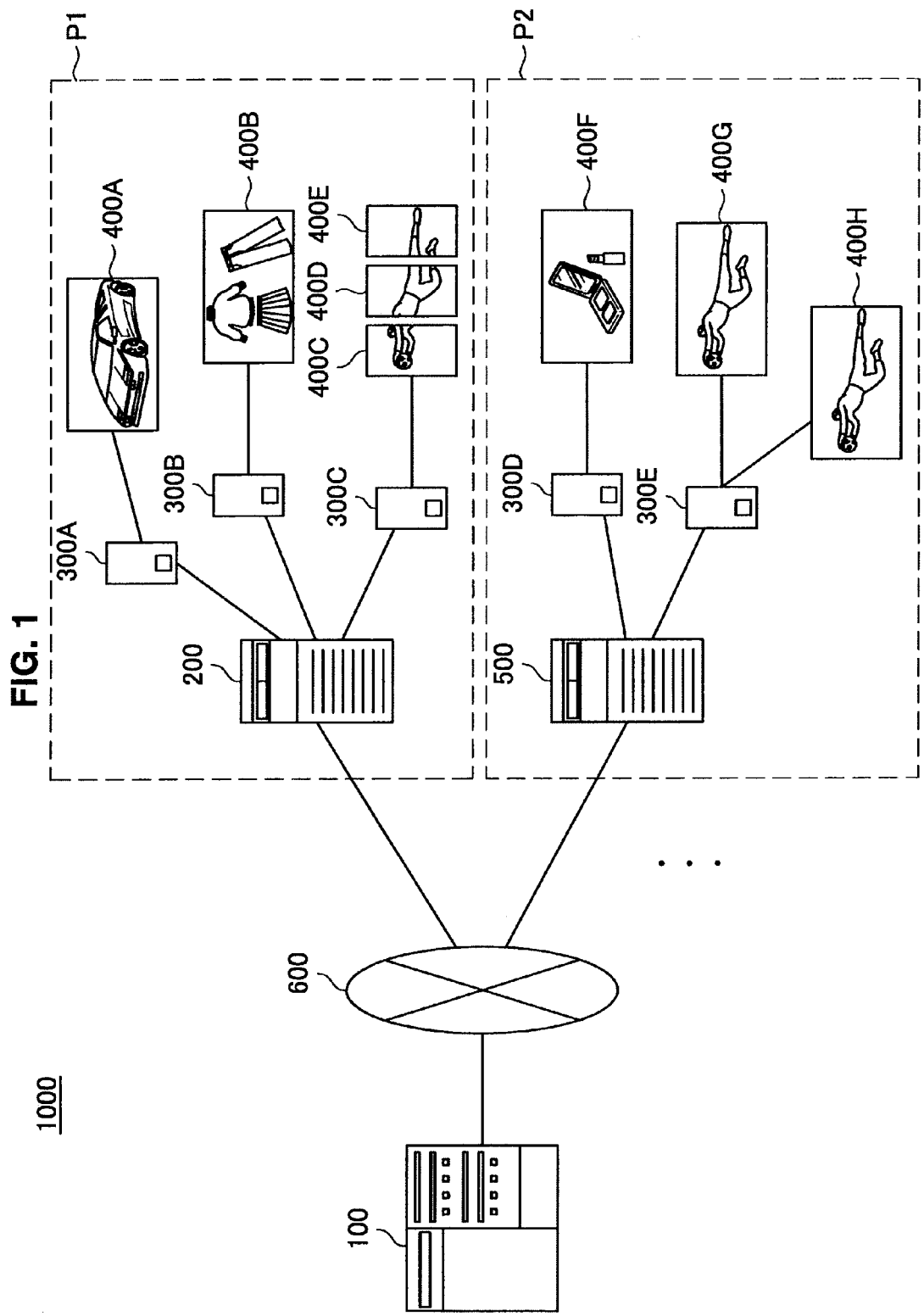
FIG. 1 is an explanatory view for describing the outline of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Approach according to the embodiment of the present invention
2. Information processing system according to the embodiment of the present invention
3. Program according to the embodiment of the present invention (Approach According to the Embodiment of the Present Invention)

Prior to describing the configuration of the information processing system (hereinafter referred to as "information processing system 1000") according to the embodiment of the present invention, the transmission and reception approach of the content data according to the embodiment of the present invention will be described. The content data related to the embodiment of the present invention is data representing video, audio, and the like, and serves to visually and auditorily transmit information.

[Outline of Information Processing System 1000]

FIG. 1 is an explanatory view for describing the outline of the information processing system 1000 according to the embodiment of the present invention. FIG. 1 shows the outline of the system when the information processing system 1000 is used in the digital signage. A case of using the information processing system 1000 in the digital signage will be described by way of example, but it can be recognized that the information processing system according to the embodiment of the present invention is not limited to such example.

The information processing system 1000 includes an information processing apparatus 100 and content data distribution systems P1, P2, . . . , where the information processing apparatus 100 and each content data distribution system are connected by network 600. The network 600 may be wired network such as LAN (Local Area Network) and WAN (Wide Area Network); wireless network such as wireless WAN (WWAN; Wireless Wide Area Network) through a base station and wireless MAN (WMAN; Wireless Metropolitan Area Network), Internet using a communication protocol such as TCP/IP (Transmission Control Protocol/Internet Protocol), and the like, but is not limited thereto.

The content data distribution system P1 includes a distribution server 200 (external device), display controllers 300A to 300C, and display devices 400A to 400E installed at predetermined locations. The distribution server 200 and each display controller are connected by private network. In the content distribution system P1, the distribution server 200 selectively transmits the content data to each display controller, and each display controller reproduces such content data. A display device connected to each display controller displays the video represented by the content data, or outputs the audio based on the content data reproduced in the display controller. According to the above configuration, the video and the audio corresponding to a specific location and a specific time can be displayed and output from the display device to transmit the visual and auditory information to an unspecified number of users in the content data distribution system P1.

The content data distribution system P2 includes a distribution server 500 (external device), display controllers 300D, 300E, and display devices 400F to 400H. In the content data distribution system P2, the video and the audio represented by the content data transmitted from the distribution server 500 to each display controller are displayed or output at the display device, similar to the content data distribution system P1. The video and the audio represented by the content data are displayed and output at the display device in other content data distribution systems by being configured similar to the content data distribution systems P1, P2.

The information processing apparatus 100 manages the content data and selectively transmits the content data to each content data distribution system in the information processing system 1000. More specifically, the information processing apparatus 100 selectively transmits the content data to the respective distribution server of each content data distribution system. Each content data distribution system thus can display and output the video and the audio represented by the content data appropriately acquired from the information processing apparatus 100, and thus can transmit fresher information corresponding to the specific location and the specific time to unspecified number of users.

The information processing system 1000 can display and output the video and the audio corresponding to the specific location and the specific time from each display device and transmit visual and auditory information to unspecified number of users according to the configuration shown in FIG. 1.

[Approach According to the Embodiment of the Present Invention]

As described using FIG. 1, in the information processing system 1000, the information processing apparatus 100 manages the content data and selectively transmits the content data to the distribution server of each content data distribution system through the network 600. Since the information processing apparatus 100 transmits the content data to each distribution server through the network 600, as shown in FIG. 1, the issue of safety related to the transmission of the content data may arise. The information processing apparatus 100 thus performs the authentication for selectively performing the process related to the transmission of the content data on the distribution server (external device), to which the content data can be transmitted, for every process related to the transmission of the content data. The information processing apparatus 100 can enable the distribution server (external device) of the transmission target to more safely receive the content data to be transmitted by performing the authentication for every process related to the transmission of the content data. More specifically, under the following assumption (0), the information processing apparatus 100 can prevent the occurrence of the issue of safety related to the transmission of the content data and enable the distribution server of the transmission target to receive the content data through the processes (1) to (4).

(0) Assumption

The information processing apparatus 100 stores device information containing first authentication information used in the authentication for selectively performing the process related to the transmission of the content data on the distribution server (external device), to which the content data can be transmitted. The device information may also include, not limited to the first authentication information, the transmission destination information indicating the transmission destination of the distribution server, to which the content data is transmitted. The transmission destination information includes IP address (Internet Protocol address), port number, and the like of the distribution server, but is not limited thereto. The information processing apparatus 100 can store the device information in a database (hereinafter referred to as "DB") format in which each information of the distribution server of transmission target is recorded for every distribution server (external device), but is not limited thereto. For instance, the information processing apparatus 100 may store the device information for every distribution server of transmission target in a file format for every distribution server. A case where the information processing apparatus 100 stores the device information of DB format (hereinafter referred to as "device information DB") will be hereinafter described by way of example.

(1) Process of Determining the Transmission Method

The information processing apparatus 100 determines the transmission method when transmitting the content data to the distribution server. More specifically, the information processing apparatus 100 determines the transmission method by selecting the transmission method of either (1-1) or (1-2) below based on whether or not the transmission destination information corresponding to the distribution server of transmission target is stored in the device information DB.

(1-1) Push Method

If the transmission destination information corresponding to the distributions server of transmission target is stored in the device information DB, the information processing apparatus 100 selects the transmission of the content data by the push method. The push method according to the embodiment of the present invention is a method of causing the distribution server to acquire the content data by transmitting, to the distribution server, trigger information for causing the distribution server of transmission target to start the process related to the acquisition of the content data. The information processing apparatus 100 starts the process related to the transmission of the content data when the distribution server receiving the trigger information transmits an acquisition request to the information processing apparatus 100.

It can be recognized that although the trigger information contains the following information, the trigger information related to the embodiment of the present invention is not limited to containing the following information.

<One Example of Information Contained in Trigger Information>

Transmission request ID (identification information for identifying the process related to the transmission of the content data)

Transmission destination information

The acquisition request is the information that serves as a trigger for the information processing apparatus 100 to start the process related to the transmission of the content data, where such acquisition request contains second authentication information for causing the information processing apparatus 100 to perform the authentication. More specifically, it can be recognized that although the acquisition request contains the following information, the acquisition request related to the embodiment of the present invention is not limited to containing the following information. For instance, the acquisition request may not contain the second authentication information, and the distribution server may simultaneously transmit the acquisition request and the second authentication information. A specific example on the flow of process related to the push method according to the embodiment of the present invention will be hereinafter described.

<One Example of Information Contained in the Acquisition Request>

Transmission request ID (e.g., "Null" if not the response with respect to the trigger information)

Device information (e.g., information corresponding to transmission destination information such as IP address and port number)

Content information (e.g., information such as content name, type of content, and date. Corresponds to information related to the content stored in the distribution server or information related to the content which reception is desired by the distribution server).

Second Authentication Information (1-2) Pull Method

If the transmission destination information corresponding to the distribution server of transmission target is not stored in the device information DB, the information processing apparatus 100 selects the transmission of the content data by the pull method. The pull method according to the embodiment of the present invention is a method in which the information processing apparatus 100 starts the process related to the transmission of the content data when the distribution server transmits the acquisition request to the information processing apparatus 100. A specific example on the flow of process related to the pull method according to the embodiment of the present invention will be hereinafter described.

The information processing apparatus 100 determines the transmission method with respect to the distribution server, to which the content data can be transmitted, by selecting the (1-1) method or the (1-2) method based on the transmission destination information of the device information DB. The information processing system 1000 can permit the coexistence of a distribution server in which direct access from the information processing apparatus 100 is difficult and a distribution server in which direct access is possible by determining the transmission method as described above. That is, in the information processing system 1000, the information processing apparatus 100 can enable the distribution server of transmission target to receive the content data regardless of whether or not the distribution server can be directly accessed from the information processing apparatus 100.

The information processing apparatus 100 determines the distribution server, to which the content data can be transmitted, based on the distribution schedule set in advance, etc.

[Method of Setting Distribution Schedule]

Figure 2:
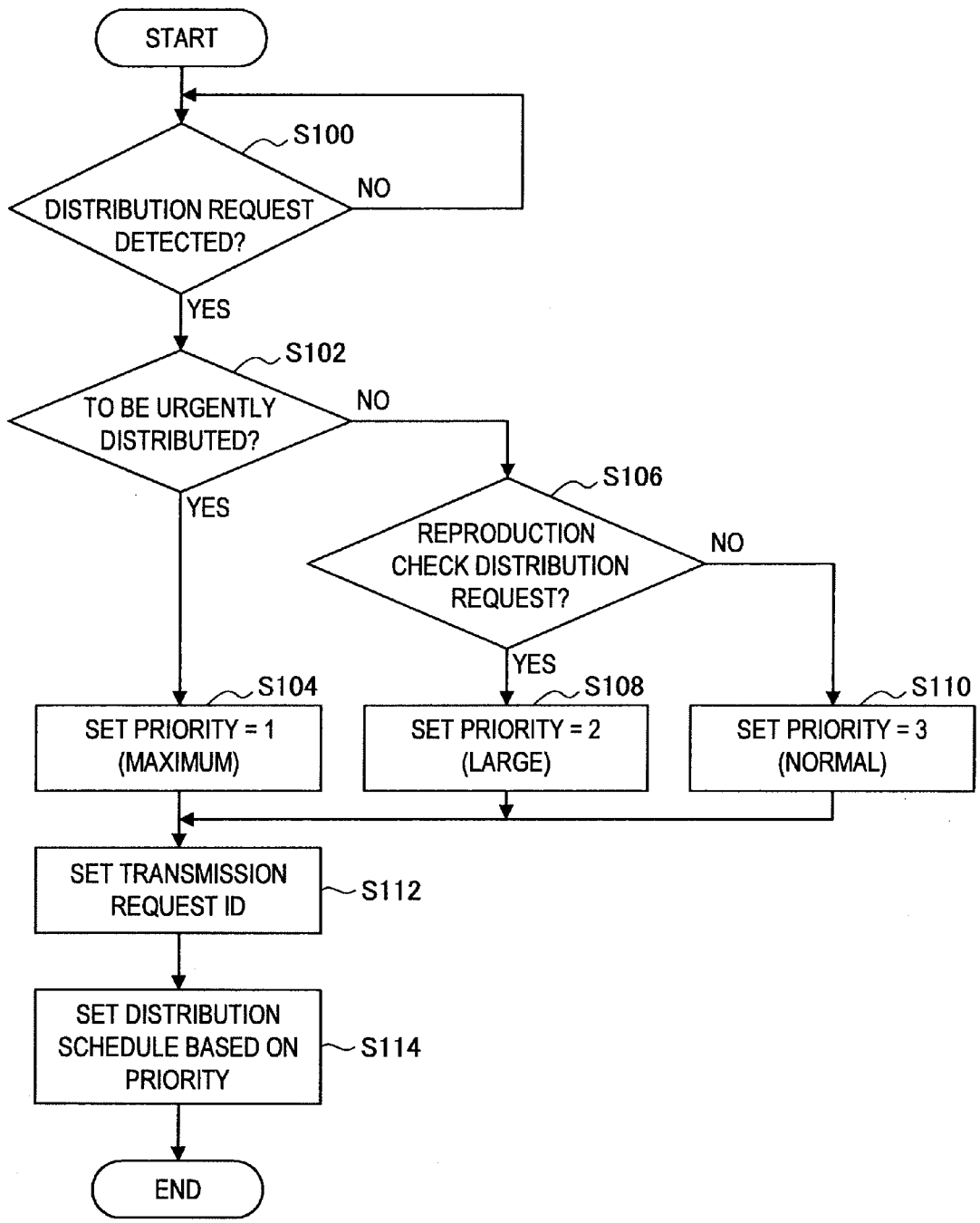
FIG. 2 is a flowchart showing an example of a method of setting the distribution schedule in an information processing apparatus 100 according to the embodiment of the present invention.

FIG. 2 is a flowchart showing an example of a method of setting the distribution schedule in the information processing apparatus 100 according to the embodiment of the present invention.

The information processing apparatus 100 determines whether or not a distribution request of the content data is detected (S100). The information processing apparatus 100 may perform the process of step S100 by receiving the distribution request transmitted from another device, but this is not the sole case. The information processing apparatus 100 may perform the process of step S100 based on the distribution request corresponding to the user input of the user of the information processing apparatus 100. The distribution request contains information specifying the distribution server of transmission target, information specifying the content data to transmit, time limit information of when completing the transmission of the content data, and the like, but is not limited thereto. For instance, the distribution request may also contain reproduction check information specifying the transmission of the content data to a reproduction check device for checking the reproduction of the content data.

When determining that the distribution request is not detected in step S100, the information processing apparatus 100 does not proceed the process until the distribution request is detected.

When determining that the distribution request is detected in step S100, the information processing apparatus 100 determines whether or not to urgently distribute the content data (S102). The information processing apparatus 100 performs the determination of step S102 based on the time limit information contained in the distribution request, and the current date and time, but this is not the sole case.

When determining to distribute the content data urgently in step S102, the information processing apparatus 100 sets the priority to priority=1 (maximum) (S104).

When determining not to urgently distribute the content data in step S102, the information processing apparatus 100 determines whether or not the request is a reproduction check distribution request (S106). The information processing apparatus 100 performs the determination of step S106 based on the reproduction check information contained in the distribution request, but is not limited thereto.

When determining as the reproduction check distribution request in step S106, the information processing apparatus 100 sets the priority to priority=2 (large) (S108).

When not determining as the reproduction check distribution request in step S106, the information processing apparatus 100 sets the priority to priority=3 (normal) (S110).

After the priorities are set in steps S104, S108, and S110, the information processing apparatus 100 sets a transmission request ID (S112). The information processing apparatus 100 sets the distribution schedule based on the priority (S114). The information processing apparatus 100 sets the distribution schedule such that the content data is transmitted faster to the distribution server corresponding to the transmission request ID of higher priority (small value of priority in the above example). The information processing apparatus 100 sets the distribution schedule such that the content data is transmitted in the order the distribution request is detected if the transmission request ID of the same priority is in plurals, but this is not the sole case.

The information processing apparatus 100 can set the distribution schedule by using the method shown in FIG. 2. The order of the distribution server to transmit the content data in the information processing apparatus 100 is not limited to the above. For instance, the information processing apparatus 100 can determine an arbitrary distribution server to a distribution server to transmit the content data based on the user operation of the user of the information processing apparatus 100.

(2) Reception Determination Process of Acquisition Request

The information processing apparatus 100 determines whether or not the acquisition request transmitted from the distribution server is received. The information processing apparatus 100 starts the process related to the transmission of the content data when receiving the acquisition request.

(3) Authentication Process

When receiving various types of processing requests (other processing requests will be hereinafter described) such as the acquisition request transmitted from the distribution server, the information processing apparatus 100 authenticates the distribution server that transmitted the processing request based on the second authentication information contained in the processing request and the device information. The information processing apparatus 100 determines whether or not the device that transmitted the processing request is the distribution server of transmission target through a matching process of the second authentication information and the first authentication information contained in the device information, but the authentication method is not limited thereto.

The information processing apparatus 100 performs authentication based on the second authentication information contained in the processing request every time various types of processing requests are received, so that the information processing apparatus 100 can perform the process related to the transmission of the content data with respect to the distribution server of transmission target. Thus, the information processing apparatus 100 can prevent spoofing of the distribution server receiving the content data, alteration and tapping of the transmitted content data, and the like.

(4) Process Related to the Transmission of Content Data

The information processing apparatus 100 performs various types of process related to the transmission of the content data when the authentication is completed based on the processing result of the process of (3) (authentication process). The information processing apparatus 100 thus prevents spoofing of the distribution server receiving the content data, alteration and tapping of the transmitted content data, and the like, and enables the distribution server of transmission target to receive the content data to be transmitted.

The information processing apparatus 100 performs an unauthorized access process if the authentication is not completed in the processing result of the process of (3) (authentication process). The unauthorized access process according to the embodiment of the present invention includes registering information such as IP address and MAC address (Media Access Control address) of the external device that transmitted the processing request to the DB serving as a non-processing target device, but is not limited thereto. When the information of the non-processing target device is registered in the DB (so-called black list), the information processing apparatus 100 can enable the distribution server of transmission target to more reliably receive the content data to be transmitted.

The information processing apparatus 100 prevents the rise of the safety issue related to the transmission of the content data by the processes of (1) to (4), and enables the distribution server of transmission target to receive the content data to be transmitted.

[One Example of Process in Information Processing Apparatus 100 and Process in Each Distribution Server]

To more specifically describe each process related to the approach according to the embodiment of the present invention, one example of the process in the information processing apparatus 100 and the process in each distribution server will be described. The distribution server 200 shown in FIG. 1 will be described for the distribution server, by way of example. The other distribution servers according to the embodiment of the present invention are similar to the distribution server 200, and thus the description will be omitted.

[One Example of Process in Information Processing Apparatus 100]

Figure 3:
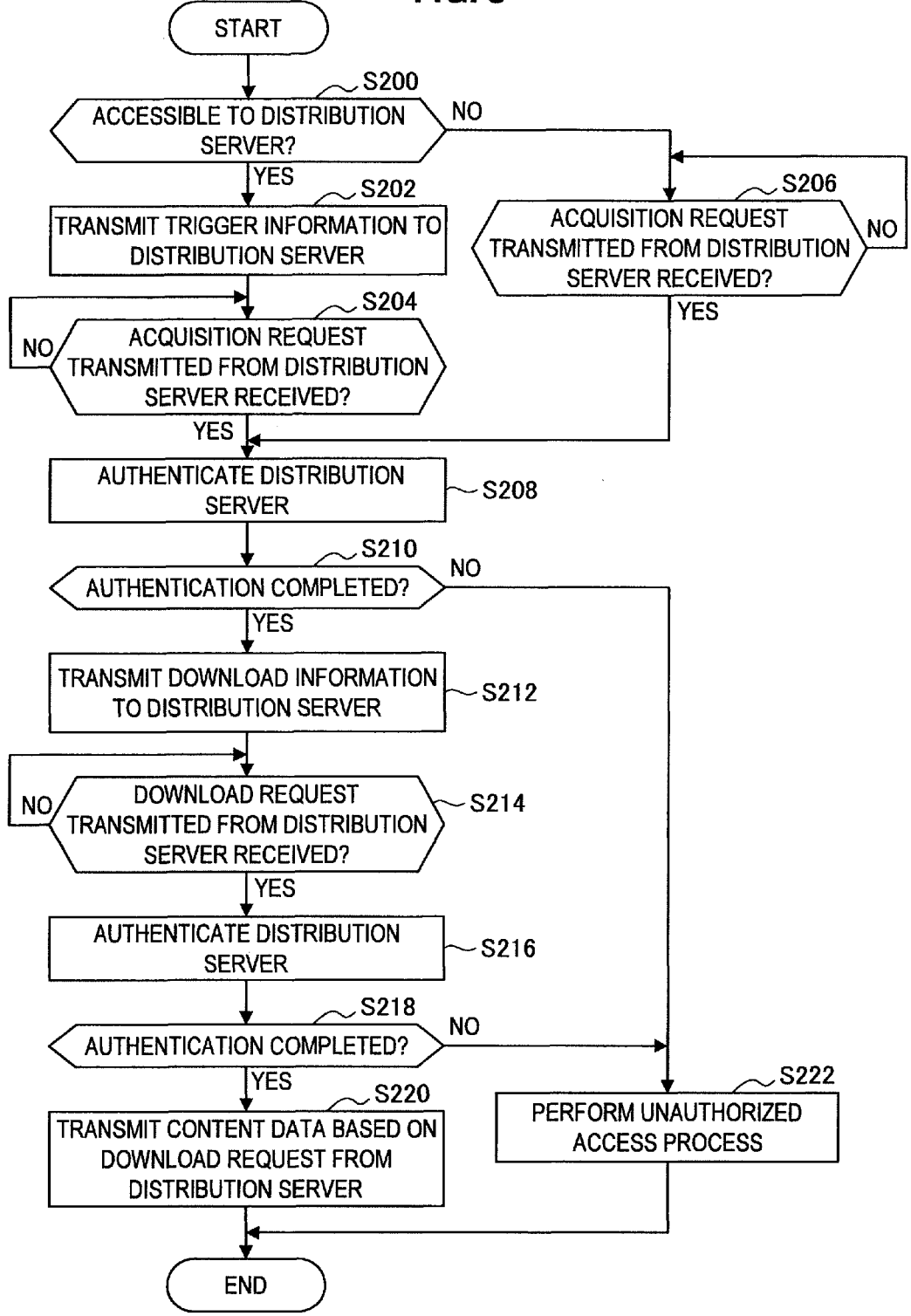
FIG. 3 is a flowchart showing an example of the process in the information processing apparatus according to the embodiment of the present invention.

FIG. 3 is a flowchart showing an example of the process in the information processing apparatus 100 according to the embodiment of the present invention. FIG. 3 shows the process in which the information processing apparatus 100 transmits the content data to one distribution server. The information processing apparatus 100 can transmit the content to each of the plurality of distribution servers by performing the process shown in FIG. 2 to each distribution server of transmission target.

The information processing apparatus 100 determines whether or not the distribution server of the transmission destination of the content data is accessible (S200). The information processing apparatus 100 can perform the determination of step S200 based on whether or not the transmission destination information corresponding to the distribution server of transmission target is stored in the device information DB.

When determining that the distribution server is not accessible in step S200, the information processing apparatus 100 determines whether or not the acquisition request transmitted from the distribution server is received (S206). The transition from the process of step S200 to the process of step S206 is equivalent to selecting the pull method.

When determining that the acquisition request transmitted from the distribution server is not received in step S206, the information processing apparatus 100 does not proceed the process until determined that the acquisition request is received (until receiving the acquisition request).

When determining that the distribution server is accessible in step S200, the information processing apparatus 100 transmits the trigger information to the distribution server (S202). The information processing apparatus 100 transmits the trigger information based on the transmission destination information corresponding to the distribution server of transmission target to the device information DB. The transition from the process of step S200 to the process of step S202 is equivalent to selecting the push method.

Even if the trigger information transmitted in step S202 is acquired by a device of non-transmission target, the relevant device is excluded from the distribution server of transmission target by the authentication process in steps S208 and S210, to be hereinafter described. Thus, the content data is prevented from being transmitted to the device of non-transmission target even if the trigger information transmitted by the information processing apparatus 100 is acquired by the device of non-transmission target.

After transmitting the trigger information in step S202, the information processing apparatus 100 determines whether or not the acquisition request transmitted from the distribution server is received (S204). When determining that the acquisition request transmitted from the distribution server is not received in step S204, the information processing apparatus 100 does not proceed the process until determined that the acquisition request is received (until receiving the acquisition request). When determining that the acquisition request is not received even after a predetermined time has elapsed from the transmission of the trigger information in step S202, the information processing apparatus 100 may again perform the process from step S202 (so-called retry process).

When determining that the acquisition request is received in step S204 or step S206, the information processing apparatus 100 authenticates the distribution server that transmitted the acquisition request based on the second authentication information contained in the acquisition request, and the device information being stored (S208). The information processing apparatus 100 determines whether or not the authentication is completed (S210).

When determining that the authentication is not completed in step S210 (e.g., when authentication fails), the information processing apparatus 100 performs an unauthorized access process (S222). The unauthorized access process includes registration of the information of the non-processing target device to the DB (so-called, black list), but is not limited thereto.

When determining that the authentication is completed in step S210, the information processing apparatus 100 transmits the download information to the distribution server (S212). The download information according to the embodiment of the present invention is the information for the distribution server (external device) of the transmission destination to acquire (download) the content data. The download information contains the following information, but it can be recognized that the download information according to the embodiment of the present invention is not limited to containing the following information.

<One Example of Information Contained in the Download Information>
  transmission request ID
  transmission destination information
  content information content data acquiring information (e.g., URL indicating download destination of content data, hash value of content data, etc.)

After transmitting the download information in step S212, the information processing apparatus 100 determines whether or not the download request transmitted from the distribution server is received (S214). When determining that the download request transmitted from the distribution server is not received in step S214, the information processing apparatus 100 does not proceed the process until determined that the download request is received (until receiving the download request).

The download request according to the embodiment of the present invention notifies the information processing apparatus 100 that the distribution server acquires (downloads) the content data, and causes the information processing apparatus 100 to transmit the content data. The distribution server transmits the content data corresponding to the download information to the information processing apparatus 100 by accessing the URL of the download destination indicated by the content data acquiring information contained in the download information. The download request contains the second authentication information for causing the information processing apparatus 100 to perform the authentication. More specifically, the download request contains the following information, but it can be recognized that the download request according to the embodiment of the present invention is not limited to containing the following information. For instance, the second authentication information may not be contained in the download request, and the distribution server may simultaneously transmit the download request and the second authentication information.

<One Example of Information Contained in the Download Request>
  transmission request ID (transmission request ID corresponding to download information)
  device information
  second authentication information When determining that the download request is received in step S214, the information processing apparatus 100 authenticates the distribution server that transmitted the download request based on the second authentication information contained in the download request and the device information being stored (S216). The information processing apparatus 100 then determines whether or not the authentication is completed (S218).

When determining that the authentication is not completed in step S218 (e.g., when authentication fails), the information processing apparatus 100 performs the unauthorized access process (S222).

When determining that the authentication is completed in step S218, the information processing apparatus 100 transmits the content data to the distribution server that transmitted the download request based on the download request from the distribution server.

The information processing apparatus 100 can realize the processes (1) to (4) by performing the process shown in FIG. 3. Therefore, the information processing apparatus 100 can prevent the rise of the safety issue related to the transmission of the content data, and enable the distribution server of transmission target to receive the content data to be transmitted.

The process in the information processing apparatus 100 according to the embodiment of the present invention is not limited to the process shown in FIG. 3. For instance, the information processing apparatus 100 may perform the authentication based on the second authentication information contained in acquisition report information indicating the acquiring result (reception result) of the content data transmitted from the distribution server after receiving the content data. The information processing apparatus 100 can recognize if the distribution server of the transmission destination received the content data to be transmitted by performing the authentication based on the acquisition report information. Even in an event the device other than the distribution server of the transmission destination acquires the content data, the recurrence of such event can be prevented by performing the unauthorized access process.

The acquisition report information according to the embodiment of the present invention contains the following information, but it can be recognized that the acquisition report information according to the embodiment of the present invention is not limited to containing the following information. For instance, the acquisition report information may not contain the second authentication information, and the distribution server may simultaneously transmit the acquisition report information and the second authentication information.

<One Example of Information Contained in the Acquisition Report Information>
- transmission request ID (transmission request ID corresponding to download information)
- acquisition result information of content data (e.g., flag indicating success or fail)
- second authentication information

[One Example of Process in Distribution Server 200]

Figure 4:
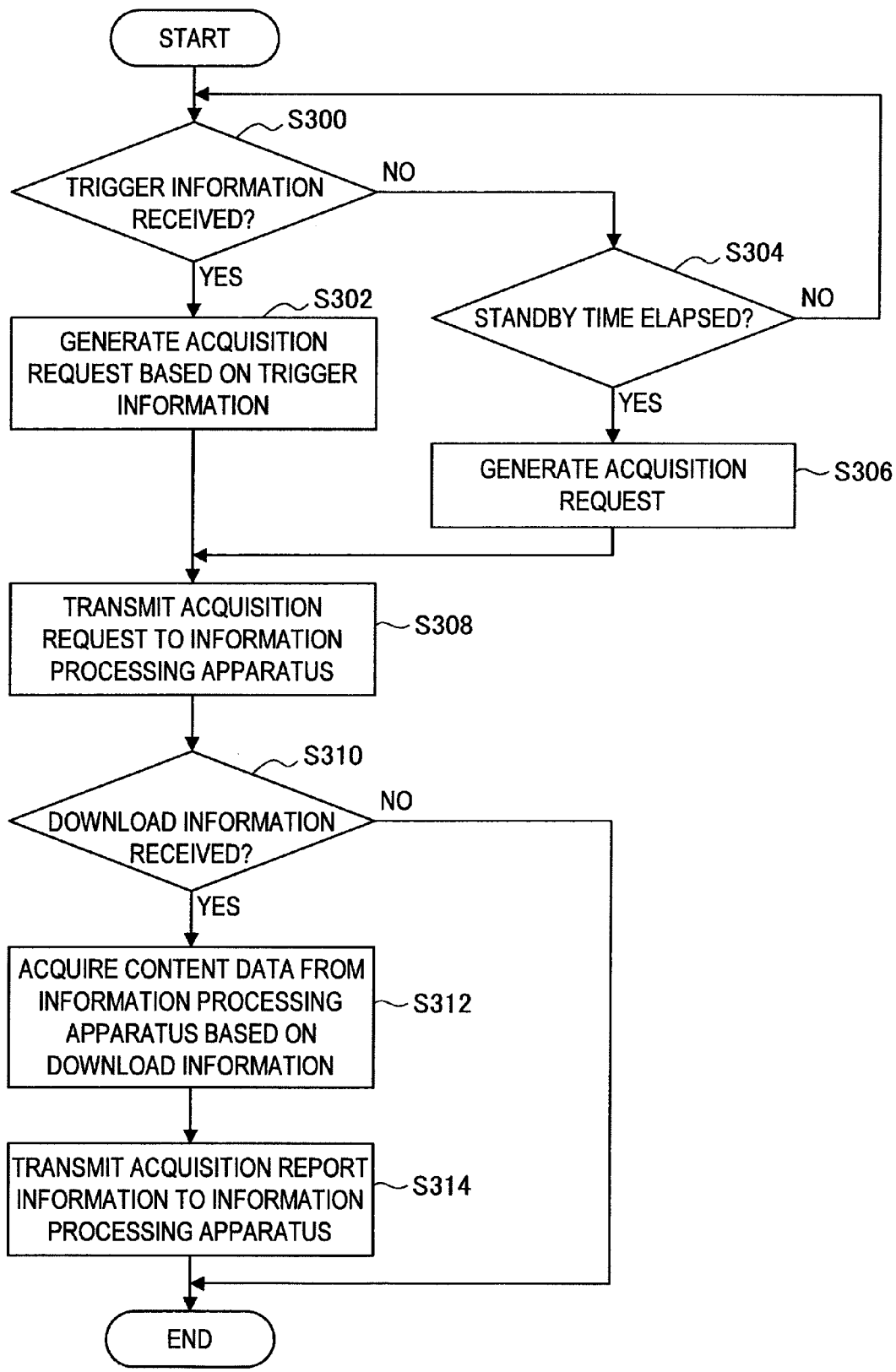
FIG. 4 is a flowchart showing one example of the process in the distribution server according to the embodiment of the present invention.

One example of the process performed in the distribution server 200 in correspondence to the process in the information processing apparatus 100 shown in FIG. 3 will be describe below. FIG. 4 is a flowchart showing one example of the process in the distribution server 200 according to the embodiment of the present invention. The processes shown in FIG. 4 are not processes that are completed once performed, but are processes repeatedly performed every time the process is terminated.

The distribution server 200 determines whether or not the trigger information is received (S300).

When determining that the trigger information is received in step S300, the distribution server 200 generates an acquisition request based on the trigger information (S302). The distribution server 200 then transmits the acquisition request to the information processing apparatus 100 (S308). The transition from the process of step S300 to the process of step S302 corresponds to when the push method is selected in the information processing apparatus 100.

When determining that the trigger information is not received in step S300, the distribution server 200 determines whether or not a standby time has elapsed (S304). The distribution server 200 can determine that the standby time has elapsed when a predetermined time has elapsed from transmission of the previous acquisition request, but is not limited thereto. For instance, the distribution server 200 can determine that the standby time has elapsed when the time indicated on the clock of the distribution server 200 reaches the transmission time of the acquisition request set in advance.

When determining that the predetermined time has not elapsed in step S304, the distribution server 200 repeats the process from step S300.

When determining that the predetermined time has elapsed in step S304, the distribution server 200 generates the acquisition request (S306). The distribution server 200 then transmits the acquisition request to the information processing apparatus 100 (S308). The transition from the process of step S304 to the process of step S306 corresponds to when the pull method is selected in the information processing apparatus 100.

After transmitting the acquisition request in step S308, the distribution server 200 determines whether or not the download information is received (S310).

When determining that the download information is not received within a time defined in advance from the transmission of the acquisition request in step S310, the distribution server 200 terminates the process.

When determining that the download information is received in step S310, the distribution server 200 acquires the content data from the information processing apparatus 100 based on the download information (S312). The distribution server 200 then transmits the acquisition report information corresponding to the acquisition result of the content data to the information processing apparatus 100 (S314).

The distribution server 100 can acquire (receive) the content data transmitted from the information processing apparatus 100 through the processes shown in FIG. 4.

(Information Processing System 1000 According to the Embodiment of the Present Invention)

The configuration of the information processing system 1000 including the information processing apparatus 100 capable of realizing the processes (1) to (4) related to the approach according to the embodiment of the present invention described above will now be described.

Figure 5:
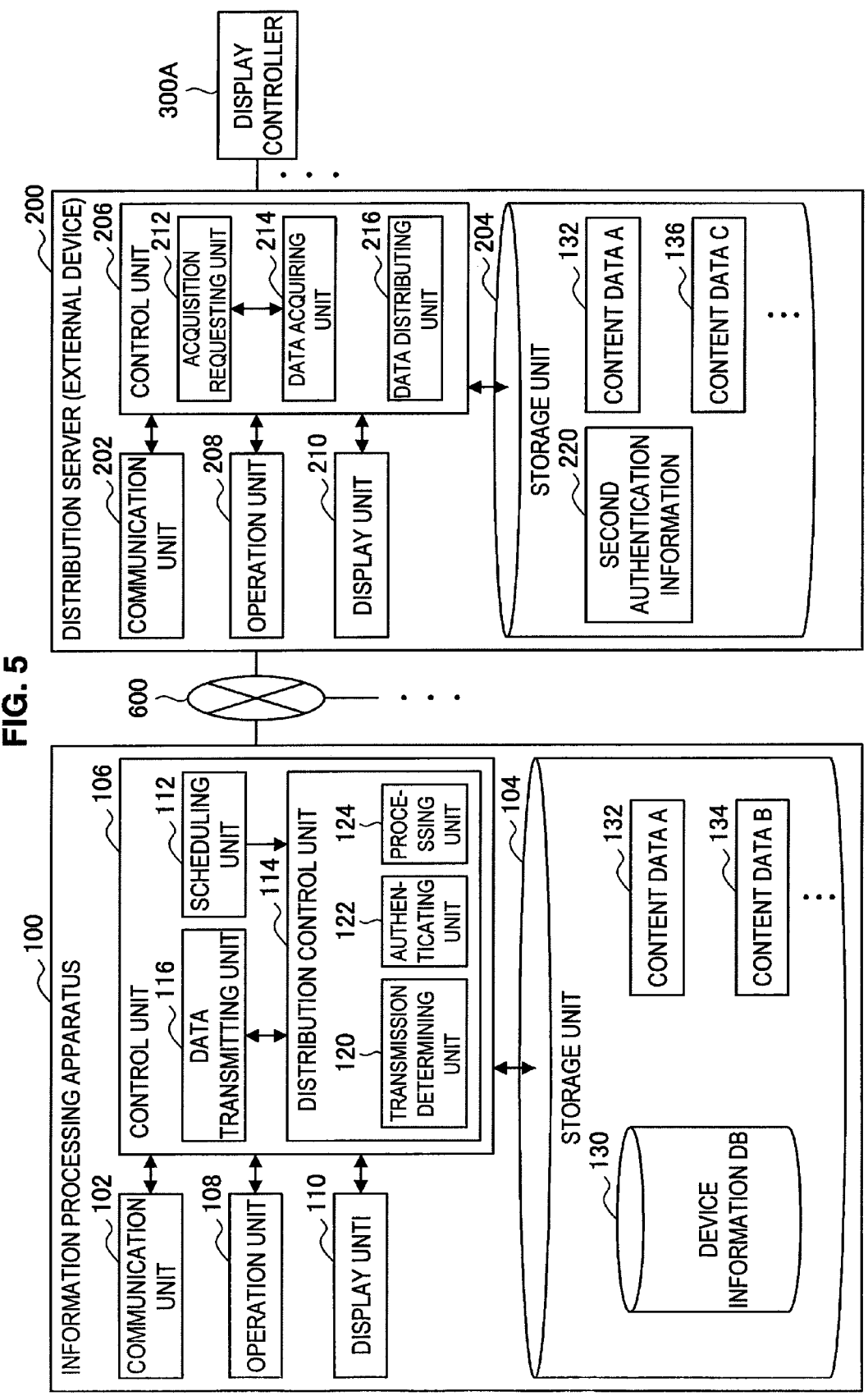
FIG. 5 is an explanatory view showing one example of the configuration of the information processing system according to the embodiment of the present invention.

FIG. 5 is an explanatory view showing one example of the configuration of the information processing system 1000 according to the embodiment of the present invention. In FIG. 5, the distribution server 200 is shown as the distribution server according to the embodiment of the present invention, and the display controller 300A is shown as the display controller according to the embodiment of the present invention.

[Information Processing Apparatus 100]

The information processing apparatus 100 includes a communication unit 102, a storage unit 104, a control unit 106, an operation unit 108, and a display unit 110.

The information processing apparatus 100 may include a ROM (Read Only Memory; not shown), a RAM (Random Access Memory; not shown), and the like. The information processing apparatus 100 may connect each components by a bus serving as a data transmission path. The ROM stores programs, and control data such as calculation parameter used by the control unit 106. The RAM primarily stores the program, and the like to be executed by the control unit 106.

[Hardware Configuration Example of Information Processing Apparatus 100]

Figure 6:
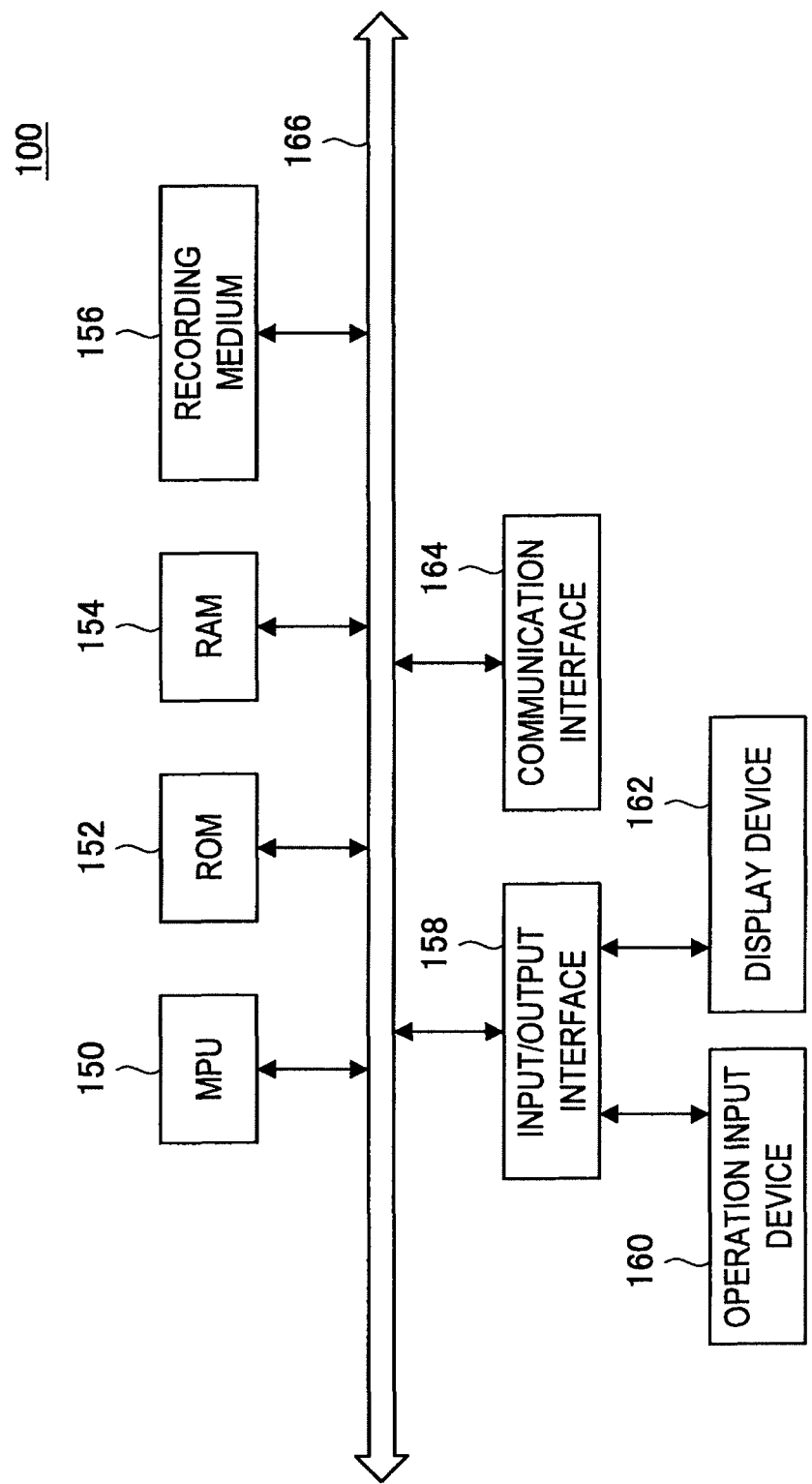
FIG. 6 is an explanatory view showing one example of the hardware configuration of the information processing apparatus according to the embodiment of the present invention.

FIG. 6 is an explanatory view showing one example of the hardware configuration of the information processing apparatus 100 according to the embodiment of the present invention. With reference to FIG. 6, the information processing apparatus 100 includes an MPU 150, a ROM 152, a RAM 154, a recording medium 156, an input/output interface 158, an operation input device 160, a display device 162, and a communication interface 164. The information processing apparatus 100 connects each component with a bus 166 serving as a data transmission path.

The MPU 150 is configured by a MPU (Micro Processing Unit), a chip set integrated with a plurality of circuits for realizing the control function, and the like, and functions as the control unit 106 for controlling the entire information processing apparatus 100. The MPU 150 can also serve as a scheduling unit 112, a distribution control unit 114, and a data transmitting unit 116, to be hereinafter described in the information processing apparatus 100.

The ROM 152 stores programs and control data such as calculation parameter used by the MPU, and the RAM 154 primarily stores programs and the like to be executed by the MPU.

The recording medium 156 functions as the storage unit 104, and stores device information DB, content data, application, and the like. The recording medium 156 may be a magnetic recording medium such as hard disc; a non-volatile memory such as EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory); and the like, but is not limited thereto.

The input/output interface 158 connects the operation input device 160 and the display device 162. The operation input device 160 functions as the operation unit 108, and the display device 162 functions as the display unit 110. The input/output interface 158 may be a USB (Universal Serial Bus) terminal, DVI (Digital Visual Interface) terminal, HDMI (High-Definition Multimedia Interface) terminal, and the like, but is not limited thereto. The operation input device 160 is arranged on the information processing apparatus 100, and is connected with the input/output interface 158 at the interior of the information processing apparatus 100. The operation input device 160 may be a button, direction key, rotary selector such as jog dial, or a combination thereof, but is not limited thereto. The display device 162 is arranged on the information processing apparatus 100, and is connected with the input/output interface 158 at the interior of the information processing apparatus 100. The display device 162 may be a LCD (Liquid Crystal Display) or an organic EL display (organic Electro-Luminescence display or PLED display (Organic Light Emitting Diode display), but is not limited thereto. It can be recognized that the input/output interface 158 may be connected to the operation input device (e.g., keyboard, mouse, etc.) or the display device (e.g., external display etc.) serving as the external device of the information processing apparatus 100.

The communication interface 164 is a communication unit arranged in the information processing apparatus 100, and functions as the communication unit 102 for performing wireless/wired communication with the external device such as the distribution server 200 through the network 600 (or directly). The communication interface 164 may be a communication antenna and a RF circuit (wireless communication); a IEEE 802.15.1 port and a transmission/reception circuit (wireless communication); a IEEE 802.11b port and a transmission/reception circuit (wireless communication); or a LAN terminal and a transmission/reception circuit (wired communication), but is not limited thereto. For instance, the communication interface 164 may be configured to correspond to the network 600.

The information processing apparatus 100 realizes the process of (1) (process of determining the transmission method) to the process of (4) (process related to the transmission of the content data) by the hardware configuration shown in FIG. 6. Therefore, the information processing apparatus 100 prevents rise of the safety issue related to the transmission of the content data, and enables the distribution server of transmission target to receive the content data to be transmitted.

With reference again to FIG. 5, the components of the information processing apparatus 100 will be described. The communication unit 102 is a communication means arranged in the information processing apparatus 100, and performs wired/wireless communication with the external device such as the distribution server 200 through the network (or directly). The communication of the communication unit 102 is controlled by the control unit 106.

The storage unit 104 is a storage means arranged in the information processing apparatus 100. Here, the storage unit 104 may be a magnetic recording medium such as hard disc or a non-volatile memory such as flash memory, but is not limited thereto.

The storage unit 104 stores the device information DB, the content data, the application, and the like. In FIG. 5, an example where the device information DB 130, the content data A 132 and the content data B 134 are stored in the storage unit 104 is shown, but this is not the sole case. For instance, the storage unit 104 may also store the DB (so-called black list) recorded with information on the non-processing target device, and various information (data) such as application executable by the control unit 106.

The control unit 106 is configured by a MPU, a chip set, and the like, and functions to control the entire information processing apparatus 100. The control unit 106 includes the scheduling unit 112, the distribution control unit 114, and the data transmitting unit 116, and realizes the process of (1) (process of determining the transmission method) to the process of (4) (process related to the transmission of content data).

The scheduling unit 112 performs the process related to the method of setting the distribution schedule, and sets the distribution schedule. The scheduling unit 112 transmits the set distribution schedule to the distribution control unit 114.

The distribution control unit 114 performs the process of (1) (process of determining the transmission method) to the process of (4) (process related to the transmission of content data). The distribution control unit 114 includes a transmission determining unit 120, an authenticating unit 122, and a processing unit 124. The transmission determining unit 120 performs the process of (1) (process of determining the transmission method) and the process of (2) (Reception determination process of acquisition request). The authenticating unit 122 performs the process of (3) (authentication process). The processing unit 124 performs the process of (4) (process related to the transmission of content data). It can be recognized that the configuration of the distribution control unit 114 is not limited to the configuration of including the transmission determining unit 120, the authenticating unit 122, and the processing unit 124 in FIG. 5.

The data transmitting unit 116 selectively transmits the content data to the distribution server that made the download request (one example of processing request) and authenticated by the authenticating unit 122 based on the processing result of the processing unit 124.

The control unit 106 realizes the process of (1) (process of determining the transmission method) to the process of (4) (process related to the transmission of content data) by including the scheduling unit 112, the distribution control unit 114, and the data transmitting unit 116. The configuration of the control unit 106 is not limited thereto. For instance, the control unit 106 may include a communication control unit (not shown) for controlling the communication in the communication unit 102.

The operation unit 108 is an operation unit arranged in the information processing apparatus 100 that enables the operation by the user. The information processing apparatus 100 can cause the information processing apparatus 100 to perform the process desired by the user of the information processing apparatus 100 such as new registration of various types of information and update of information to the device information DB, generation of the distribution request, and the like by including the operation unit 108. The operation unit 108 may be an operation input device such as keyboard and mouse, a button, a direction key, a rotary selector such as jog dial, or a combination thereof, but is not limited thereto.

The display unit 110 is a display unit arranged in the information processing apparatus 100, and displays various information on the display screen. A screen displayed on the display screen of the display unit 110 may be an operation screen for causing the information processing apparatus 100 to perform the desired operation. The display unit 110 may be a LCD or an organic EL display, but is not limited thereto. For instance, the information processing apparatus 100 may configure the display unit 110 with a touch screen. In the above case, the display unit 110 functions as the operation display unit capable of performing both the user operation and the display.

The information processing apparatus 100 can perform the process of (1) (process of determining the transmission method) to the process of (4) (process related to the transmission of the content data) according to the configuration shown in FIG. 5. Therefore, the information processing apparatus 100 prevents the rise of the safety issue related to the transmission of the content data, and enables the distribution server of transmission target to receive the content data to be transmitted.

[Distribution Server 200]

The configuration example of the distribution server 200 will be described below. The distribution server 200 includes a communication unit 202 (server side communication unit), a storage unit 204 (server side storage unit), a control unit 206, an operation unit 208, and a display unit 210.

The distribution server 200 may include a ROM (not shown), a RAM (not shown), and the like. The distribution server 200 can connect each component by a bus serving as a data transmission path. Here, the ROM stores programs and control data such as calculation parameter used by the control unit 206. The RAM primarily stores programs and the like to be executed by the control unit 206.

[Hardware Configuration Example of Distribution Server 200]

Figure 7:
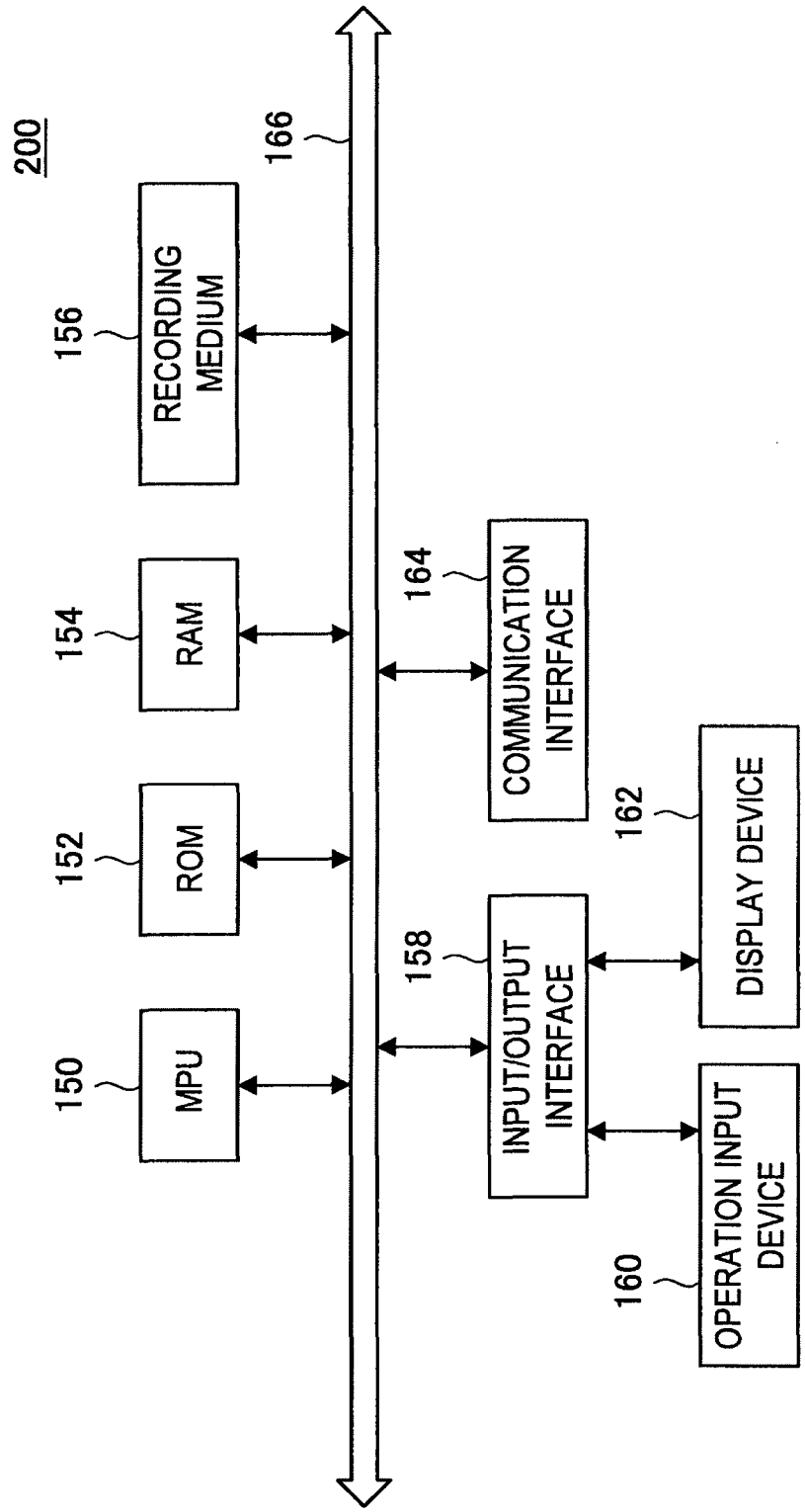
FIG. 7 is an explanatory view showing one example of the hardware configuration of the distribution server according to the embodiment of the present invention.

FIG. 7 is an explanatory view showing one example of the hardware configuration of the distribution server 200 according to the embodiment of the present invention. With reference to FIG. 7, the distribution server 200 includes the MPU 150, the ROM 152, the RAM 154, the recording medium 156, the input/output interface 158, the operation input device 160, the display device 162, and the communication interface 164. The distribution server 200 connects each component with the bus 166 serving as a data transmission path. As shown in FIG. 7, the distribution server 200 can be configured by the hardware similar to the information processing apparatus 100 shown in FIG. 6.

The MPU 150 has a configuration similar to the MPU 150 shown in FIG. 6, and functions as the control unit 206 for controlling the entire distribution server 200. The MPU 150 can also serve as an acquisition requesting unit 212, a data acquiring unit 214, and a data distributing unit 216, to be hereinafter described, in the distribution server 200.

The recording medium 156 functions as the storage unit 204, and stores the second authentication information, the content data acquired from the information processing apparatus 100, the application, and the like.

The communication interface 164 is a communication means arranged in the distribution server 200, and functions as the communication unit 202 for performing wireless/wired communication with the information processing apparatus 100 and the like through the network 600 (or directly). The communication interface 164 can play a role of performing communication with the display controller 300A through the private network (not shown).

The distribution server 200 realizes the process shown in FIG. 4 according to the hardware configuration shown in FIG. 7. The distribution server 200 distributes the content data to each display controller according to the hardware configuration shown in FIG. 7.

With reference again to FIG. 5, the components of the distribution server 200 will be described. The communication interface 202 is a communication means arranged in the distribution server 200, and functions to perform wired/wireless communication with the information processing apparatus 100 and the like through the network 600 (or directly). The communication interface 202 plays a role of performing communication with each display controller through the private network (not shown). The communication of the communication unit 202 is controlled by the control unit 206.

The storage unit 204 is a storage means arranged in the distribution server 200. The storage unit 204 may be a magnetic recording medium such as hard disc, or a non-volatile memory such as flash memory, but is not limited thereto.

The storage unit 204 stores the second authentication information, the content data acquired from the information processing apparatus 100, the application, and the like. An example in which the second authentication information 220, the content data A 132, and the content data C 136 are stored in the storage unit 104 is shown in FIG. 5, but is not limited thereto. For instance, the storage unit 204 may store the schedule information recorded with information on the schedule for distributing the content data to each display controller. An example in which the second authentication information 220 is stored in the storage unit 204 is shown in FIG. 5, but this is not the sole case. For instance, the second authentication information is stored in the device authentication device such as the device authentication dongle, and the distribution server 200 can use the second authentication information stored in the connected device authentication device.

The control unit 206 is configured by a MPU, a chip set, and the like, and functions to control the entire distribution server 200. The control unit 206 includes the acquisition requesting unit 212, the data acquiring unit 214, and the data distributing unit 216, and performs the process shown in FIG. 4 and distributes the content data to each display controller.

The acquisition requesting unit 212 generates the acquisition request based on the trigger information received by the communication unit 202 or the elapse of the standby time. The acquisition requesting unit 212 then transmits the acquisition request to the information processing apparatus 100 through the communication unit 202.

The data acquiring unit 214 transmits a download request to the information processing apparatus 100 through the communication unit 202 based on the download information received by the communication unit 202. The distribution server 200 can acquire the content data from the information processing apparatus 100 by transmitting the download request from the data acquiring unit 214. When the communication unit 202 receives the content data, the data acquiring unit 214 stores the received content data in the storage unit 204.

The data distributing unit 216 selectively transmits the content data stored in the storage unit 204 to each display controller based on the schedule information (not shown) stored in the storage unit 204.

The control unit 206 performs the process shown in FIG. 4 and distributes the content to each display controller by including the acquisition requesting unit 212, the data acquiring unit 214, and the data distributing unit 216. The configuration of the control unit 206 is not limited thereto. For instance, the control unit 206 may include a communication control unit (not shown) for controlling the communication in the communication unit 202.

The operation unit 208 is an operation means arranged in the distribution server 200 that enables the operation by the user. The distribution server 200 can cause the distribution server 200 to perform the process desired by the user of the distribution server 200. The operation unit 208 may be an operation input device such as keyboard and mouse, a button, a direction key, a rotary selector such as jog dial, or a combination thereof, but is not limited thereto.

The display unit 210 is a display means arranged in the distribution server 200, and displays various information on the display screen. A screen displayed on the display screen of the display unit 210 may be an operation screen for causing the distribution server 200 to perform the desired operation. The display unit 210 may be a LCD or an organic EL display, but is not limited thereto.

The distribution server 200 can realize the process shown in FIG. 4 and the distribution of the content data to each display controller according to the configuration shown in FIG. 5.

The information processing system 1000 realizes the approach according to the embodiment of the present invention, and enables the distribution server (external device) of transmission target to safely receive the content data to be transmitted by including the information processing apparatus 100 shown in FIG. 5.

[Example of Process Related to Transmission and Reception of the Content Data Between Information Processing Apparatus 100 and Distribution Server 200]

The process related to the transmission and reception of the content data between the information processing apparatus 100 and the distribution server 200 will be more specifically described below. One example of the process related to the transmission and reception of the content data between the information processing apparatus 100 and the distribution server 200 will be described below, but transmission and reception of the content data are performed between the information processing apparatus 100 and other distribution servers through similar process. A case where the information processing apparatus 100 selects the push method and a case where the information processing apparatus 100 selects the pull method will be described below.

[1] Case where Information Processing Apparatus 100 Selects the Push Method

FIG. 8 is an explanatory view showing a first example of the process related to the transmission and reception of the content data between the information processing apparatus 100 and the distribution server 200 according to the embodiment of the present invention. FIG. 8 shows one example of the process when the information processing apparatus 100 selects the push method according to the embodiment of the present invention. Although the communication unit 102 of the information processing apparatus 10, the communication unit 202 of the distribution server 200, and the network 600 are not shown in FIG. 8, the communication between the information processing apparatus 100 and the distribution server 200 are carried out through such components.

The distribution control unit 114 of the information processing apparatus 100 performs a transmission determination process (S400). Since FIG. 8 shows a case when the information processing apparatus 100 selects the push method, the push method is assumed to be selected in step S400.

When the transmission determination process is performed in step S400, and the transmission method is determined as the push method, the distribution control unit 114 transmits the trigger information to the distribution server 200 (S402).

When receiving the trigger information transmitted from the information processing apparatus 100 in step S402, the acquisition requesting unit 212 of the distribution server transmits the acquisition request to the information processing apparatus 100 (S404).

When receiving the acquisition request transmitted from the distribution server 200 in step S404, the distribution control unit 114 performs authentication on the distribution server 200 based on the second authentication information contained in the acquisition request and the device information DB stored in the storage unit 104 (S406; authentication process).

After the authentication is completed in step S406, the distribution control unit 114 generates the download information (S408; download information generation process). The distribution control unit 114 then transmits the generated download information to the distribution server 200 (S410).

When receiving the download information transmitted from the information processing apparatus 100 in step S410, the acquisition requesting unit 212 transmits an acquisition instruction for acquiring the content data to the data acquiring unit 214 (S412). The acquisition requesting unit 212 transmits the transmission request ID and the content data acquiring information contained in the download information to the data acquiring unit 214 with the acquisition instruction, but is not limited thereto. For instance, the acquisition requesting unit 212 may transmit the download information to the data acquiring unit 214 with the acquisition instruction.

The data acquiring unit 214 transmits the download request to the information processing apparatus 100 based on the acquisition instruction of step S412 (S414).

When receiving the download request transmitted from the distribution server 200 in step S414, the distribution control unit 114 performs authentication on the distribution server 200 based on the second authentication information contained in the download request and the device information DB stored in the storage unit 104 (S416; authentication process).

After the authentication is completed in step S416, the distribution control unit 114 transmits a transmission instruction of the content data to the data transmitting unit 116 (S418). The data transmitting unit 116 then transmits the content data to the distribution server 200 based on the transmission instruction of step S418 (S420; transmission process).

When receiving the content data transmitted from the information processing apparatus 100 in step S420, the data acquiring unit 214 transmits the acquisition result (e.g., fail, error, etc.) of the content data to the acquisition requesting unit 212 (S422). The acquisition requesting unit 212 transmits the acquisition report information based on the acquisition result of step S422 to the information processing apparatus 100 (S424).

When receiving the acquisition report information transmitted from the distribution server 200 in step S424, the distribution control unit 114 performs authentication on the distribution server 200 based on the second authentication information contained in the acquisition report information and the device information DB stored in the storage unit 104 (S426; authentication process).

If the information processing apparatus 100 selects the push method, the process shown in FIG. 8 is carried out between the information processing apparatus 100 and the distribution server 200. The information processing apparatus 100 performs the authentication process every time various types of requests and various types of information are received from the distribution server 200, and proceeds the process when the authentication is completed. Therefore, if the process shown in FIG. 8 is carried out between the information processing apparatus 100 and the distribution server 200, the information processing apparatus 100 can enable the distribution server (external device) of transmission target to more safely receive the content data to be transmitted.

[2] Case where Information Processing Apparatus 100 Selects the Pull Method

FIG. 9 is an explanatory view showing a second example of the process related to the transmission and reception of the content data between the information processing apparatus 100 and the distribution server 200 according to the embodiment of the present invention. FIG. 9 shows one example of the process when the information processing apparatus 100 selects the pull method according to the embodiment of the present invention. Similar to FIG. 8, although the communication unit 102 of the information processing apparatus 10, the communication unit 202 of the distribution server 200, and the network 600 are not shown in FIG. 9, the communication between the information processing apparatus 100 and the distribution server 200 are carried out through such components.

The distribution control unit 114 of the information processing apparatus 100 performs a transmission determination process (S500). Since FIG. 9 shows a case when the information processing apparatus 100 selects the pull method, the pull method is assumed to be selected in step S500.

When the transmission determination process is performed in step S500, and the transmission method is determined as the pull method, the distribution control unit 114 does not proceed the process until receiving the acquisition request transmitted from the distribution server 200 (S502; wait for reception of acquisition request).

The acquisition requesting unit 212 of the distribution server 200 transmits the acquisition request to the information processing apparatus 100 based on elapse of the standby time (S504).

When receiving the acquisition request transmitted from the distribution server 200 in step S504, the distribution control unit 114 performs authentication on the distribution server 200, similar to step S406 shown in FIG. 8 (S506; authentication process).

After the authentication is completed in step S506, the distribution control unit 114 generates the download information (S508; download information generation process). The distribution control unit 114 then transmits the generated download information to the distribution server 200 (S510).

When receiving the download information transmitted from the information processing apparatus 100 in step S510, the acquisition requesting unit 212 transmits an acquisition instruction for acquiring the content data to the data acquiring unit 214, similar to step S412 shown in FIG. 8 (S512).

The data acquiring unit 214 transmits the download request to the information processing apparatus 100 based on the acquisition instruction of step S512 (S514).

When receiving the download request transmitted from the distribution server 200 in step S514, the distribution control unit 114 performs authentication on the distribution server 200, similar to step S416 shown in FIG. 8 (S516; authentication process).

After the authentication is completed in step S516, the distribution control unit 114 transmits a transmission instruction of the content data to the data transmitting unit 116 (S518). The data transmitting unit 116 then transmits the content data to the distribution server 200 based on the transmission instruction of step S518 (S520; transmission process).

When receiving the content data transmitted from the information processing apparatus 100 in step S520, the data acquiring unit 214 transmits the acquisition result of the content data to the acquisition requesting unit 212, similar to step S422 shown in FIG. 8 (S522). The acquisition requesting unit 212 transmits the acquisition report information based on the acquisition result of step S522 to the information processing apparatus 100 (S524).

When receiving the acquisition report information transmitted from the distribution server 200 in step S524, the distribution control unit 114 performs authentication on the distribution server 200, similar to step S426 shown in FIG. 8 (S526, authentication process).

If the information processing apparatus 100 selects the pull method, the process shown in FIG. 9 is carried out between the information processing apparatus 100 and the distribution server 200. With reference to FIGS. 8 and 9, it can be seen that the information processing apparatus 100 performs similar process in steps S404 to S426 of FIG. 8 and in steps S504 to S526 of FIG. 9. That is, the information processing apparatus 100 performs the authentication process every time various types of requests and various types of information are received from the distribution server 200, and proceeds the process when the authentication is completed even when the pull method is selected, similar to when the push method is selected. Therefore, if the process shown in FIG. 9 is carried out between the information processing apparatus 100 and the distribution server 200, the information processing apparatus 100 can enable the distribution server (external device) of transmission target to more safely receive the content data to be transmitted.

As described above, the information processing system 1000 according to the embodiment of the present invention includes the information processing apparatus 100 and one or more distribution servers. The information processing apparatus 100 performs, under the assumption described in (0), the process of (1) (process of determining the transmission method), the process of (2) (Reception determination process of acquisition request), the process of (3) (authentication process), and the process of (4) (process related to the transmission of content data). The information processing apparatus 100 performs the authentication process every time various types of requests and various types of information are received from each distribution server, and proceeds the process when the authentication is completed. Therefore, the information processing apparatus 100 can enable the distribution server (external device) of transmission target to more safely receive the content data to be transmitted.

The information processing apparatus 100 selects the push method for the transmission method of the content data when the transmission destination information is recorded in the device information DB stored in the storage unit 104, and selects the pull method in other cases. The pull method according to the embodiment of the present invention is a transmission method of starting the process related to the transmission of content data based on the acquisition request transmitted from the distribution server. The push method according to the embodiment of the present invention is a transmission method of transmitting the acquisition request to the distribution server by having the information processing apparatus 100 to transmit the trigger information to the distribution server, and starting the process related to the transmission of content data based on the acquisition request. Thus, the information processing apparatus 100 can perform the process related to the transmission of content data using the same authentication mechanism when the push method selected or when the pull method is selected, as shown in FIGS. 8 and 9. In the push method according to the embodiment of the present invention, the acquisition request is transmitted to the distribution server when the information processing apparatus 100 transmits the trigger information to the distribution server. Thus, the information processing apparatus 100 using the push method according to the embodiment of the present invention can perform the transmission process of the content data at the equivalent time as when the information processing apparatus uses the push method of the related art of directly transmitting the content data to the distribution server. Therefore, the information processing apparatus 100 can enable the distribution server (external device) of transmission target to more efficiently receive the content data to be transmitted.

The information processing apparatus 100 may not arrange the VPN device on the information processing apparatus 100 side and each distribution server side as when using the push method of the related art by using the push method according to the embodiment of the present invention. Therefore, the information processing apparatus 100 can prevent increase in device cost and operation cost in the information processing system 1000. Since the information processing apparatus 100 can manage the transmission of the acquisition request from each distribution server by using the push method according to the embodiment of the present invention, increase in processing load of the information processing apparatus 100 can be prevented. Thus, the information processing apparatus 100 can prevent stop or degradation of the service even when used in the service for reproducing the content data at a specific location or a specific time such as in the digital signage.

The information processing apparatus 100 sets a priority to the distribution server, to which the content data is transmitted, and determines the distribution schedule based on the priority. The information processing system 1000 including the information processing apparatus 100 can respond to the process specific to the digital signage such as switching of the reproduction time of the content data and the reproduction check of the content data. Therefore, the information processing system 100 can prevent degradation of the server even when used in the digital signage, and thus can be suitably applied to the digital signage. It can be recognized that the information processing system 1000 is not limited to being applied to the digital signage.

The information processing apparatus 100 has been described as a component configuring the information processing system 1000 according to the embodiment of the present invention, but the embodiment of the present invention is not limited to such mode. The embodiment of the present invention may be applied to various devices such as server and computer including PC.

The distribution servers 200, 500, . . . have been described as a component configuring the information processing system 1000 according to the embodiment of the present invention, but the embodiment of the present invention is not limited to such mode. The embodiment of the present invention may be applied to various devices such as server and computer including PC.

(Program Related to the Information Processing Apparatus According to the Embodiment of the Present Invention)

The external device of transmission target can more safely receive the content data to be transmitted by a program for causing the computer to function as the information processing apparatus 100 according to the embodiment of the present invention.

It should be understood by those skilled in the art that various modifications, combinations, sub-combinations and alterations may occur depending on design requirements and other factors insofar as they are within the scope of the appended claims or the equivalents thereof.

For instance, a program (computer program) for causing the computer to function as the information processing apparatus 100 according to the present invention is provided, as described above, but the embodiment of the present invention may also provide a storage medium stored with each program described above.

The configuration described above is an example of the embodiment of the present invention, and obviously belongs to the technical scope of the present invention.

The present application contains subject matter related to that disclosed in Japanese Priority Patent Application JP 2008-253820 filed in the Japan Patent Office on Sep. 30, 2008, the entire content of which is hereby incorporated by reference.

What is claimed is:

1. An information processing apparatus, including a processor, comprising:
   a communication unit for performing communication with one or more external devices;
   a storage unit for storing device information containing first authentication information used for authentication to selectively perform a process related to transmission of content data on the external device to which the content data is transmittable;
   a transmission determining unit for determining whether to transmit to the external device trigger information for causing the external device to transmit an acquisition request for starting the process related to transmission of the content data based on a determination result indicating whether the transmission destination information indicating a transmission destination of the external device to transmit the content data is stored in the storage unit;
   an authenticating unit for authenticating the external device that has transmitted a processing request based on second authentication information contained in the processing request transmitted from the external device and the device information stored in the storage unit,
      wherein the authenticating unit authenticates the external device that has transmitted the acquisition request based on the second authentication information contained in the acquisition request transmitted from the external device and the device information stored in the storage unit;
   a processing unit for selectively performing a process corresponding to the processing request based on an authentication result in the authenticating unit; and
   a data transmitting unit for selectively transmitting content data to the external device, which transmitted the processing request and which is authenticated by the authenticating unit, based on a processing result of the processing unit.

2. The information processing apparatus according to claim 1, wherein
   the processing unit causes the communication unit to transmit the trigger information to the external device if the transmission determining unit determines that the trigger information is to be transmitted, and not to transmit the trigger information to the external device if the transmission determining unit determines that the trigger information is not to be transmitted.

3. The information processing apparatus according to claim 2, wherein
the processing unit causes the communication unit to transmit to the external device download information for causing the external device to acquire the content data when the authenticating unit completes authentication.

4. The information processing apparatus according to claim 3, wherein
the authenticating unit authenticates the external device that has transmitted a download request which is transmitted from the external device based on the download information, based on the second authentication information contained in the download request and the device information stored in the storage unit, the processing unit transmits a transmission instruction for causing the external device to transmit the content data to the data transmitting unit when the authenticating unit completes authentication, and
the data transmitting unit transmits the content data to the external device based on the transmission instruction.

5. The information processing apparatus according to claim 2, further comprising a scheduling unit for setting a transmission processing order for starting the process of transmitting the content data to the external device, wherein
the transmission determining unit determines whether to transmit the trigger information or not, based on the transmission processing order set by the scheduling unit.

6. A program embodied in a non-transitory computer-readable medium to control a computer, said program comprising the steps of:
storing, in a storage unit, device information containing first authentication information used for authentication to selectively perform a process related to transmission of content data on the external device to which the content data is transmittable,
determining whether to transmit to the external device trigger information for causing the external device to transmit an acquisition request for starting the process related to transmission of the content data based on a determination result indicating whether the transmission destination information indicating a transmission destination of the external device to transmit the content data is stored in the storage unit;
authenticating an external device that has transmitted a processing request based on device information stored in the storage unit, and second authentication information contained in the processing request transmitted from the external device received by a communication unit;
wherein the external device that has transmitted the acquisition request is authenticated based on the second authentication information contained in the acquisition request transmitted from the external device and the device information stored in the storage unit:
selectively performing a process corresponding to the processing request based on an authentication result in the authenticating step; and
selectively transmitting the content data to the external device, which transmitted the processing request and which is authenticated in the authenticating step, based on a processing result in the step for performing the process.

7. An information processing system, including a processor, comprising:
an information processing apparatus for managing transmission of content data, and one or more distribution servers for acquiring the content data from the information processing apparatus, wherein
the information processing apparatus includes:
a communication unit for performing communication with the one or more distribution servers,
a storage unit for storing device information containing first authentication information used for authentication to selectively perform a process related to transmission of content data on the distribution server to which the content data is transmittable,
a transmission determining unit for determining whether to transmit to the external device trigger information for causing the external device to transmit an acquisition request for starting the process related to transmission of the content data based on a determination result indicating whether the transmission destination information indicating a transmission destination of the external device to transmit the content data is stored in the storage unit,
an authenticating unit for authenticating the distribution server that has transmitted a processing request based on second authentication information contained in the processing request transmitted from the distribution server and the device information stored in the storage unit,
wherein the authenticating unit authenticates the external device that has transmitted the acquisition request based on the second authentication information contained in the acquisition request transmitted from the external device and the device information stored in the storage unit,
a processing unit for selectively performing a process corresponding to the processing request based on an authentication result in the authenticating unit, and
a data transmitting unit for selectively transmitting content data to the distribution server, which transmitted the processing request and which is authenticated by the authenticating unit, based on a processing result of the processing unit, and
each distribution server includes:
a server side communication unit for performing communication with the information processing apparatus,
a server side storage unit for storing the second authentication information for causing the information processing apparatus to perform the authentication,
an acquisition requesting unit for causing the communication unit to transmit to the information processing apparatus an acquisition request for starting the process related to transmission of the content data, and
a data acquiring unit for acquiring the content data from the information processing apparatus based on download information for causing the distribution server to acquire the content data transmitted from the information processing apparatus based on the acquisition request.

* * * * *